US011156735B2

(12) United States Patent
Funke, Jr. et al.

(10) Patent No.: US 11,156,735 B2
(45) Date of Patent: Oct. 26, 2021

(54) ACOUSTIC LOGGING TOOL

(71) Applicant: APS Technology, Inc., Wallingford, CT (US)

(72) Inventors: Christopher S Funke, Jr., West Haven, CT (US); Carl Allison Perry, Middletown, CT (US); Sergei Knizhnik, Exton, PA (US); Dmitry Avdeev, Exton, PA (US); Michael Joyce, Exton, PA (US)

(73) Assignee: APS Technology, Inc., Wallingford, CT (US)

( * ) Notice: Subject to any disclaimer, the term of this patent is extended or adjusted under 35 U.S.C. 154(b) by 579 days.

(21) Appl. No.: 16/057,863

(22) Filed: Aug. 8, 2018

(65) Prior Publication Data

US 2019/0049613 A1   Feb. 14, 2019

Related U.S. Application Data

(60) Provisional application No. 62/542,607, filed on Aug. 8, 2017.

(51) Int. Cl.
*G01V 1/00* (2006.01)
*G01V 1/52* (2006.01)
*G01V 1/44* (2006.01)

(52) U.S. Cl.
CPC .............. *G01V 1/523* (2013.01); *G01V 1/44* (2013.01); *G01V 2200/16* (2013.01)

(58) Field of Classification Search
USPC ......................................................... 367/25
See application file for complete search history.

(56) References Cited

U.S. PATENT DOCUMENTS

| | | | | |
|---|---|---|---|---|
| 4,712,424 A * | 12/1987 | Herron | ................... | G01V 11/00 250/256 |
| 5,357,481 A * | 10/1994 | Lester | ................... | G01V 1/523 367/31 |
| 5,886,303 A * | 3/1999 | Rodney | ................... | G01V 1/46 181/102 |
| 6,634,427 B1 * | 10/2003 | Turner | ................... | E21B 17/028 166/242.3 |
| 7,306,056 B2 * | 12/2007 | Ballantyne | .............. | E21B 7/062 175/266 |
| 9,322,947 B2 * | 4/2016 | Chang | ...................... | G01V 1/44 |
| 2003/0024761 A1 * | 2/2003 | Tashiro | .................. | G01V 1/523 181/105 |
| 2003/0106739 A1 * | 6/2003 | Arian | ....................... | G01V 1/52 181/110 |

(Continued)

*Primary Examiner* — James R Hulka
(74) *Attorney, Agent, or Firm* — Offit Kurman, P.A.; Gregory A. Grissett

(57) ABSTRACT

An embodiment of the present disclosure is an acoustic logging tool for determining a characteristic of a ground formation during a drilling operation. The acoustic logging tool includes a transmitter section that houses a transmitter that is configured to emit an acoustic signal and a receiver section spaced from the transmitter section along an axial direction. The receiver section includes a receiver that is configured to receive at least a portion of the acoustic signal. The acoustic logging tool also includes an isolator section positioned between the transmitter section and the receiver section along the axial direction.

30 Claims, 5 Drawing Sheets

(56) References Cited

U.S. PATENT DOCUMENTS

| | | | |
|---|---|---|---|
| 2005/0150692 A1* | 7/2005 | Ballantyne | E21B 7/062 |
| | | | 175/61 |
| 2005/0167101 A1* | 8/2005 | Sugiyama | G01V 1/523 |
| | | | 166/249 |
| 2005/0173185 A1* | 8/2005 | Pabon | E21B 47/017 |
| | | | 181/108 |
| 2008/0149415 A1* | 6/2008 | Botting | G01V 1/523 |
| | | | 181/102 |
| 2015/0136516 A1* | 5/2015 | Chang | G01V 1/523 |
| | | | 181/102 |
| 2017/0306709 A1* | 10/2017 | Cull | E21B 17/18 |
| 2019/0048716 A1* | 2/2019 | Perry | E21B 47/14 |

* cited by examiner

ACOUSTIC LOGGING TOOL

CROSS-REFERENCE TO RELATED APPLICATIONS

The present application claims priority to and the benefit of U.S. Provisional Application No. 62/542,607, filed Aug. 8, 2017, the entire contents of which are incorporated by reference into this application for all purposes.

TECHNICAL FIELD

The present disclosure relates to an acoustic logging tool for measuring characteristics of an earthen formation during drilling an oil and gas well.

BACKGROUND

Drilling systems are designed to drill into the earth to target hydrocarbon sources as efficiently as possible. Typical drilling systems include a rig or derrick, a drill string supported by the rig that extends into the earth, and a drill bit disposed at the end of the drill string that drills a borehole through the earth. Sometimes, the drill string of a particular drilling system can extend several miles below the surface of the earth. As a result, during a drilling operation the drill string can extend through many different subsurface formations, each of which can require different drilling parameters to optimally drill through. Because of the significant financial investment required to reach and then extract hydrocarbons from the earth, drilling operators are under pressure to drill and reach the target as quickly as possible without compromising the safety of personal operating the drilling system or the integrity of the drilling equipment. As a result, it is advantageous for an operator of a drilling system to know the properties of the subsurface formation that the drill string is currently drilling through.

One device for detecting properties of an earthen formation is an acoustic logging tool. Typical acoustic logging tools include transmitters that produce acoustic waves that travel through the earthen formation, as well as receivers that are configured to receive at least a portion of the acoustic waves. Based upon the qualities of the acoustic waves that are received by the receivers, a controller in communication with the receivers can determine, based upon calculations and predetermined formation models, the characteristics of the earthen formation through which the drill string is passing. Based upon this determination, a drilling operator can alter the drilling operation accordingly.

However, an acoustic logging tool as described above has drawbacks. When the transmitter emits acoustic waves into the earthen formation, acoustic waves also tend to propagate along the tool body and through the acoustic logging tool toward the receivers. These acoustic waves affect the accuracy of the waves received by the receiver that pass through the earthen formation, unless they can be filtered out. Alternatively, the acoustic logging tool can be constructed such that the propagation of acoustic waves along and through the acoustic logging tool from the transmitters to the receivers is minimized.

As a result, there is a need for an acoustic logging tool with adequate features for preventing the propagation of acoustic waves along the acoustic logging tool, thus acoustically isolating the transmitters from the receivers with respect to the acoustic logging tool body.

SUMMARY

An embodiment of the present disclosure is an acoustic logging tool for determining a characteristic of an earthen formation during a drilling operation. The acoustic logging tool includes a transmitter section that includes a transmitter that is configured to emit an acoustic signal. The acoustic logging tool also includes an isolator section mounted to the transmitter section. The isolator section defines an inward surface, an outward surface spaced from the inward surface, and a curved wall that extends from the inward surface to the outward surface. The inward surface, the outward surface, and the curved wall at least partially define a recess that extends around an entirety of a circumference of the isolator section. Each recess is configured to interrupt at least a portion of the acoustic signal that travels through the isolator section. The acoustic logging tool includes an receiver section mounted to the isolator section opposite to the transmitter section. The receiver section includes a receiver that is configured to receive at least a portion of the acoustic signal.

Another embodiment of the present disclosure is an acoustic logging tool for determining a characteristic of an earthen formation during a drilling operation. The acoustic logging tool includes a transmitter section that houses a transmitter configured to emit an acoustic signal. The acoustic logging tool also includes an isolator section mounted to the transmitter section, the isolator section being elongate along an axial direction and having a first cavity, a second cavity spaced from the first cavity a first distance along the axial direction, and a third cavity spaced from the second cavity a second distance along the axial direction. The second distance is different than the first distance. Furthermore, each cavity extends around an entirety of a circumference of the isolator section. Each cavity is configured to interrupt at least a portion of the acoustic signal that travels through the isolator section. The acoustic logging tool also includes an receiver section mounted to the isolator section opposite to the transmitter section along an axial direction. The receiver section includes a receiver that is configured to receive at least a portion of the acoustic signal.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

DETAILED DESCRIPTION OF ILLUSTRATIVE EMBODIMENTS

Embodiments of the present disclosure include acoustic logging tools for use in a drilling operation. The acoustic logging tool as described herein may be used to determine a characteristic of a formation during the drilling operation. As will be further explained below, the acoustic logging tool includes one or more transmitters, an isolator section with one or more isolator cavities that extend around the circumference of the logging tool, and one or more receivers. The isolator cavities are configured to isolate and/or disrupt acoustic signals traveling through the logging tool generated by the transmitter. In this manner, the acoustic logging tool is optimized to minimize the tool mode, which includes the acoustic signal generated by the transmitter. This, in turn, minimizes undo noise in the received signal so that more accurate and reliable formation velocity can be determined. This will lead to more accurate interpretations of parameters of interest, e.g. porosity, of the formation. Furthermore, the acoustic logging tool is formed using at least three distinct sections joined by weldments. By forming the acoustic logging tool in this manner, more complex internal bores, such as wire passages and other cavities can be formed into the individual sections than would otherwise be possible if similar bores and cavities where formed using conventional deep bore formation techniques. By forming three separate sections and joining them together with weldments, the intermediate or middle section, in this case the isolator section, may be formed with multiple unique features, bores, and passages.

Figure 1:
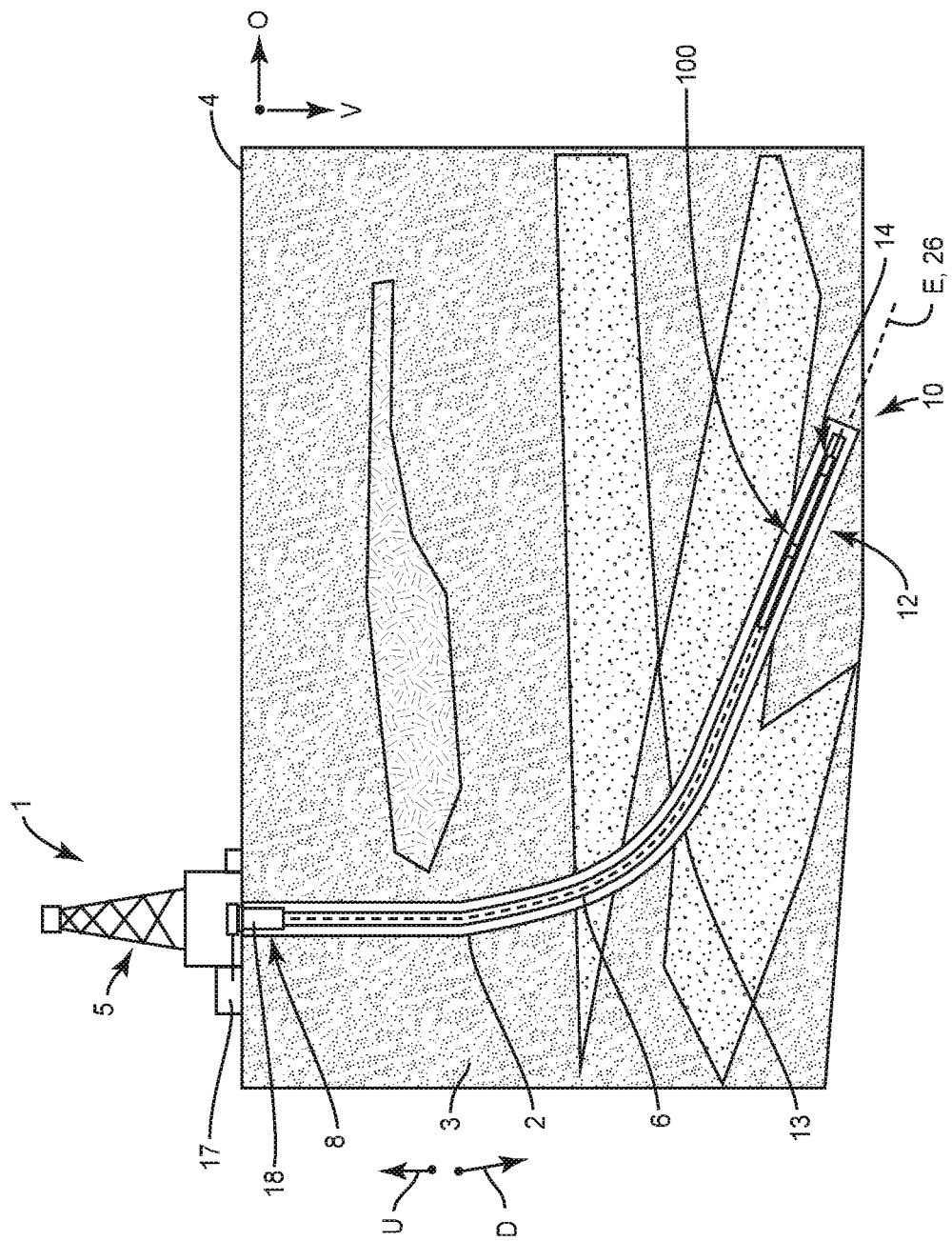
FIG. 1 is a schematic side view of a drilling system according to an embodiment of the present disclosure.

Referring to FIG. 1, a drilling system 1 is depicted that includes a rig or derrick 5 that supports a drill string 6. The drill string 6 includes a bottomhole assembly (BHA) 12 coupled to a drill bit 14, and at least one acoustic logging tool 100 disposed along the drill string 6. The drill bit 14 is configured to drill a borehole or well 2 into the earthen formation 3 along a vertical direction V and an offset direction O that is offset from or deviated from the vertical direction V. The drilling system 1 can include a surface motor (not shown) located at the surface 4 that applies torque to the drill string 6 via a rotary table or topdrive (not shown), and a downhole motor (or mud motor, not shown) disposed along the drill string 6. The downhole motor is operably coupled to the drill bit 14. Operation of the downhole motor causes the drill bit 14 to rotate along with or without rotation of the drill string 6. Accordingly, both the surface motor and the downhole motor can operate during the drilling operation to define the well 2. During the drilling operation, a pump 17 pumps drilling fluid downhole through an internal passage (not numbered) of the drill string 6 out of the drill bit 14 and back to the surface 4 through an annular passage 13 defined between the drill string 6 and the wellbore wall. The drilling system 1 can include a casing 18 that extends from the surface 4 and into the well 2. The casing 18 can be used to stabilize the formation near the surface. One or more blowout preventers can be disposed at the surface 4 at or near the casing 18.

Continuing with FIG. 1, the drill string 6 is elongate along a longitudinal central axis 26 that is aligned with a well axis E. The drill string 6 further includes an upstream end 8 and a downstream end 10 spaced from the upstream end 8 along the longitudinal central axis 26. An internal passage extends through an entirety of the drill string 6 through which drilling fluid travels to the mud motor, out of the drill bit 14, and back up to the surface through the annular passage 13. A downhole or downstream direction D refers to a direction from the surface 4 toward the downstream end 10 of the drill string 6. An uphole or upstream direction U is opposite to the downhole direction D. Thus, "downhole" and "downstream" refers to a location that is closer to the downstream end 10 of the drill string 6 than the surface 4 relative to a point of reference. "Uphole" and "upstream" refers to a location that is closer to the surface 4 than the downstream end 10 of the drill string 6 relative to a point of reference.

Continuing with FIGS. 2-7, the acoustic logging tool 100 is configured to be disposed along the drill string 6. The acoustic logging tool 100 includes a transmitter section 104, a receiver section 102 spaced uphole from the transmitter section 104 along an axial direction A, and an isolator section 108. In operation, the axial direction A may be coincident with the central axis 26. The isolator section 108 extends from the transmitter section 104 to the receiver section 102. The isolator section 108 may be joined to the receiver section 102 by an upper weldment 110. Further, the isolator section 108 is joined to the transmitter section 104 by a lower weldment 112. The upper weldment 110 and the lower weldment 112 will be discussed further below.

Figure 2:
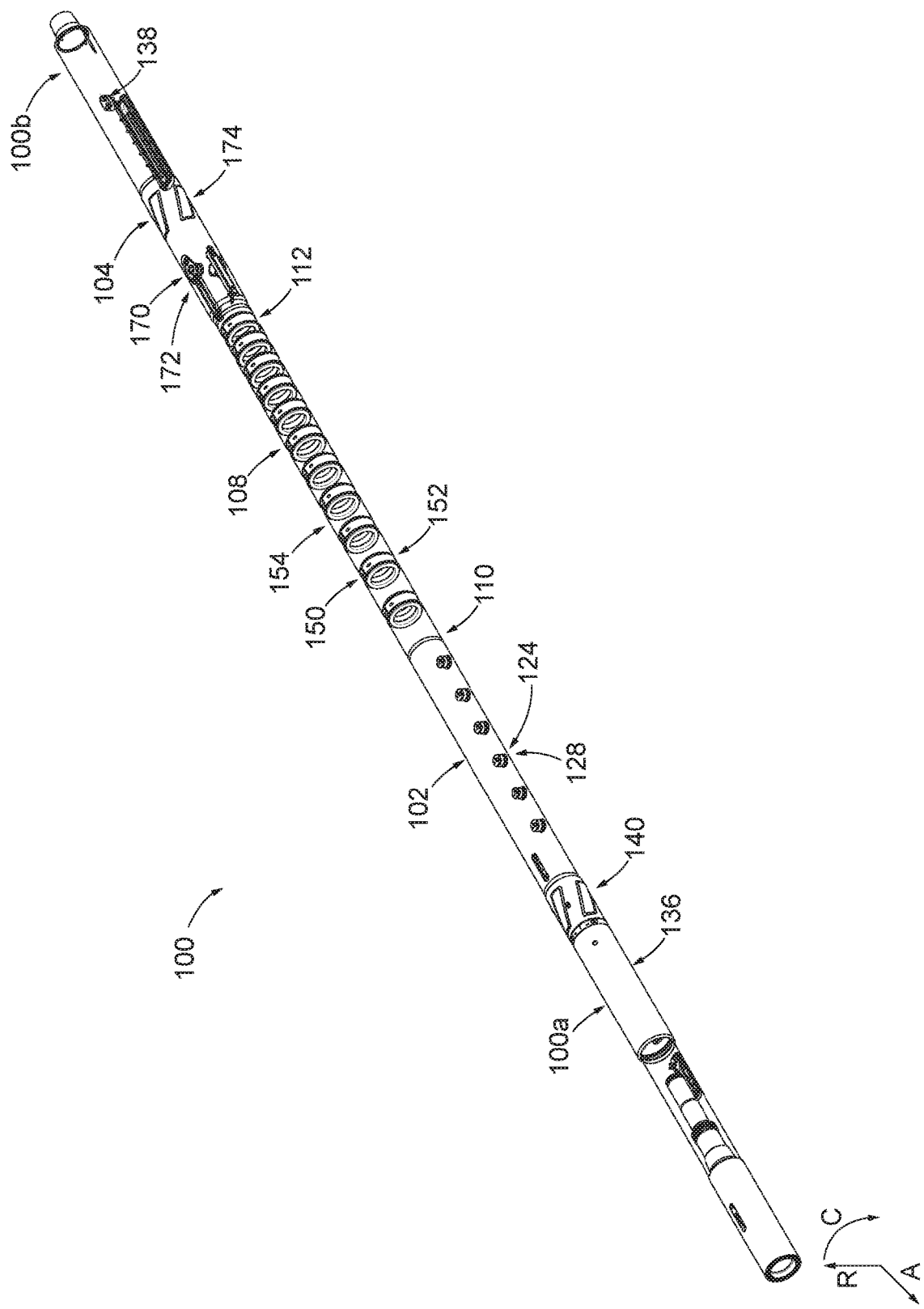
FIG. 2 is a perspective view of an acoustic logging tool according to an embodiment of the present disclosure.

Referring to FIGS. 2-7, the acoustic logging tool 100 includes a downhole end 100b, an uphole end 100a spaced from the downhole end 100b along the central axis 26, and a central bore 115 that extends from the uphole end 100a to the downhole end 100b. The uphole end 100a of the acoustic logging tool 100 can be defined by the receiver section 102 and the downhole end 100b of the acoustic logging tool 100 can be defined by the transmitter section 104. Each section of the acoustics logging tool may include a body that defines the central bore 115 when the sections are mounted together as shown in FIG. 2. The central bore 115 can include separate segments. For example, the central bore can include a first segment 115a that is defined by the receiver section 102, a second segment 115b defined by the isolator section 108, and a third segment 115c defined by the transmitter section 104. The central bore 115 can be configured to allow the passage of drilling mud through the acoustic logging tool 100 as the drilling mud flows through the drill string 6 in a downhole direction D, as described above.

Figure 3:
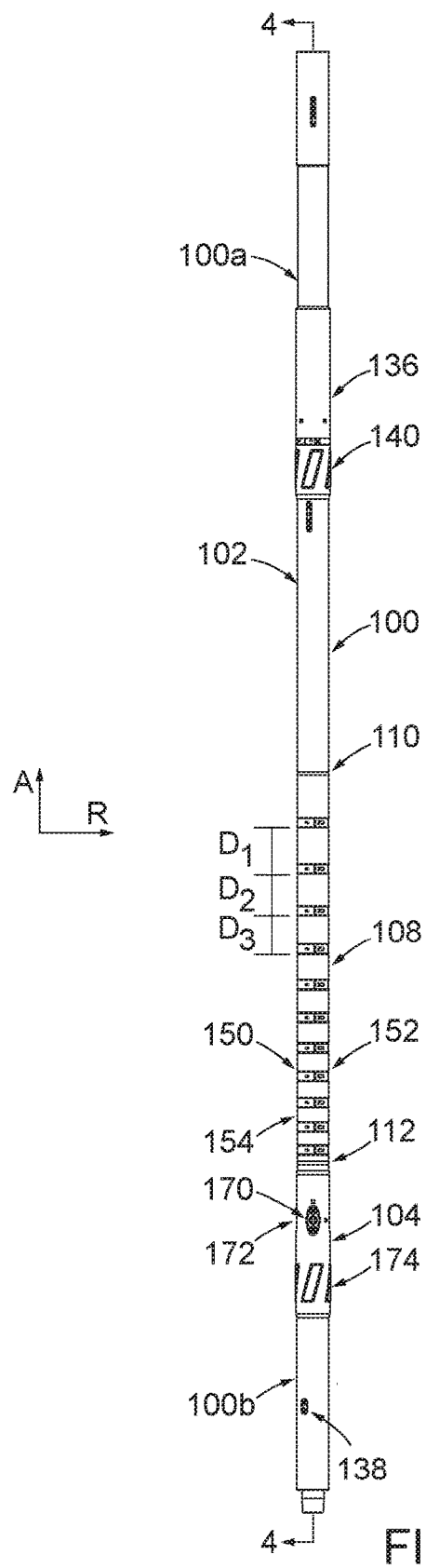
FIG. 3 is a side view of the acoustic logging tool shown in FIG. 2.
Figure 4:
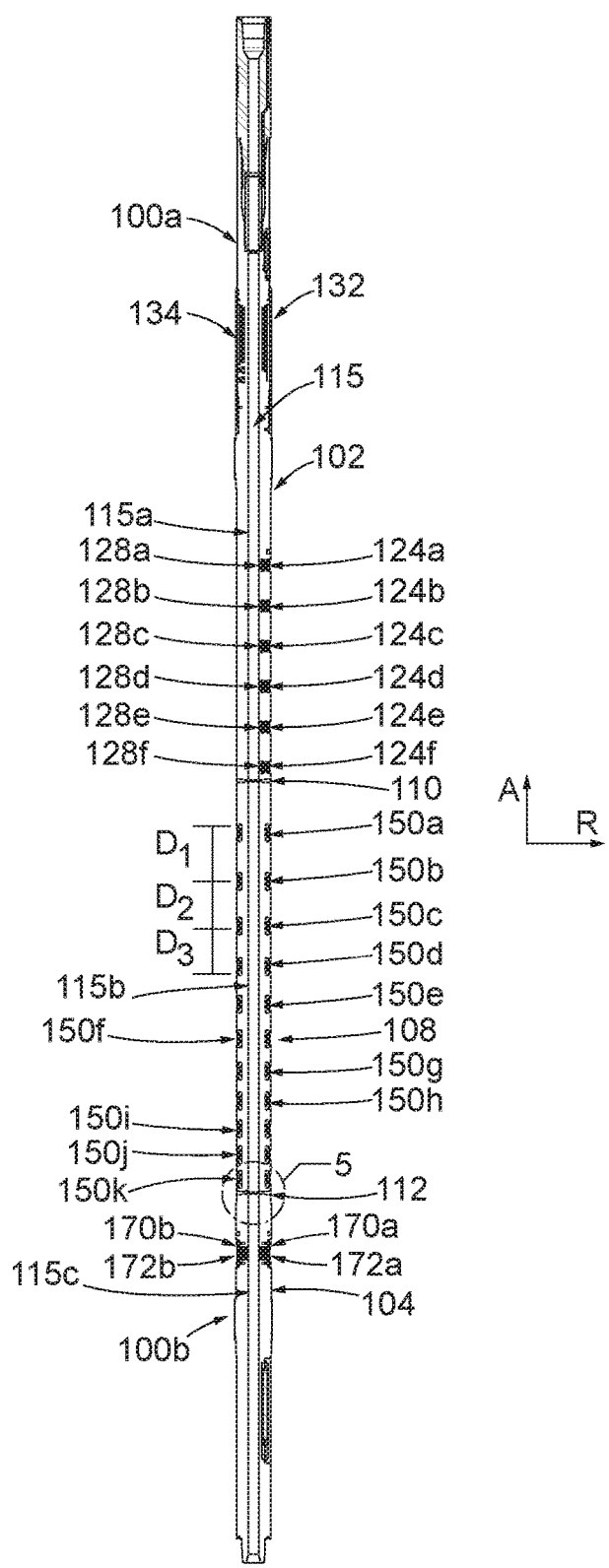
FIG. 4 is a cross-sectional view of the acoustic logging tool shown in FIG. 2 taken along the line 4-4 shown in FIG. 3.

Continuing with FIGS. 2-4, the transmitter section 104 can include at least one transmitter 172 that is configured to emit acoustic waves into the earthen formation 3 surrounding the drill string 6 when the acoustic logging tool 100 is operating downhole. The transmitter 172 may be housed in a transmitter seat 170a-170b that extends into the transmitter section 104 along the radial direction R. In the depicted embodiments, the transmitter section 104 can include two transmitters 172: a first transmitter 172a and a second transmitter 172b. Furthermore, the transmitter section 104 includes a first transmitter seat 170a and a second transmitter seat 170b that houses the first transmitter 172a and the second transmitter 172b, respectively. It should be appreciated that more or less transmitters 172 can be included, though the number of transmitters 172 and transmitter seats 170 may correlate.

The transmitters 172a-172b may be configured as transducers, such as piezoelectric transducers as known in the art. The transmitters 172a-172b can be unipole, monopole, or dipole transmitters. Alternatively, the transmitters 172a-172b can be configured as transceivers or transducers.

Continuing with FIGS. 2-4, the transmitter section 104 will be described in further detail. The transmitter section 104 is positioned in the downhole direction D relative to the receiver section 102 and is adjacent to the isolator section 108. The transmitter section 104 can include a stabilizer 174 that can be utilized to stabilize the acoustic logging tool 100 within the drill string 6 in order to avoid unintentional lateral movement of the acoustic logging tool 100 and reduce vibrations.

Continuing with FIGS. 2-5, the receiver section 102 houses at least one receiver 128 configured to capture the acoustic signal. As illustrated, the receiver section can preferably include multiple receivers 128, such as a two or more receivers, which may be referred to collectively as a receiver array. Each receiver 128 is housed in a receiver seat 124 that extends into the receiver section 102 along the radial direction R. In accordance with the depicted embodiment, the receiver section 102 includes six receiver seats 124: a first receiver seat 124a, a second receiver seat 124b, a third receiver seat 124c, a fourth receiver seat 124d, a fifth receiver seat 124e, and a sixth receiver seat 124f. The depicted receiver section 102 can therefore include six receivers 128: a first receiver 128a, a second receiver 128b, a third receiver 128c, a fourth receiver 128d, a fifth receiver 128e, and a sixth receiver 128f. However, it is contemplated that more or less receivers 128 may be included. As depicted, each of the receivers are aligned and spaced apart along the axial direction A. In this case, each of the receivers can be equally spaced apart along the axial direction A. Equal spacing is preferable because in order to use the time delay between receipt of signals by each receiver, a known and equal distance apart, to determine formation characteristics. In alternative embodiments, however, each of the receivers are spaced apart with respect each other by different distances. Accordingly, the distance between adjacent receivers varies along axial direction A. However, the receivers 128a-128f and receiver seats 124a-124f may be situated otherwise, as desired. In other embodiments, the receiver section 102 can include up to twenty-four receivers 128.

The receivers 128a-128f are configured to receive at least a portion of the acoustic signal transmitted by the transmitters 172a-172b located in the transmitter section 104. Accordingly, the receivers 128a-128f each may be configured as transducers, such as piezoelectric transducers as known in the art. Alternatively, the receivers 128a-128f can be configured as transceivers.

The receiver section 102 may also include an electronics bay 132 that is configured to contain the electrical components of the acoustic logging tool 100 and a hatch cover 134 that covers the electronics bay 132. The hatch cover 134 protects the electrical components in the electronics bay 132 from external forces, such as drilling mud that flows through the drilling system 1. Though labeled as a single element, there may be multiple electronics bays 132 located around the receiver section 102. For example, the electronics bay 132 may include four compartments, though more or less compartments are contemplated.

The receiver section 102 can further include a sleeve 136 disposed over the electronics bay 132 and the hatch 134, where the sleeve 136 further shields the electrical components in the electronics bay 132 from external forces. The sleeve 136 can be releasably coupled to the receiver section 102, such that the sleeve 136 can be removed to provide access to the electronics bay 132.

Further, the receiver section 102 can also include a stabilizer 140 and a data port 138. The stabilizer 140 can be utilized to stabilize the acoustic logging tool 100 within the drill string 6 in order to avoid unintentional lateral movement of the acoustic logging tool 100 and reduce vibrations. The data port 138 can be in electrical communication with the electrical components contained in the electronics bay 132, and can provide a drilling operator with a quick access point to extract information from or upload information to the electrical components when the acoustic logging tool 100 is positioned uphole.

The acoustic logging tool may include various electrical components that are used to operate and control the tool. For instance, the acoustic logging tool include a controller configured to operate the receivers 128a-128f and/or the transmitters 172a-172b, a storage unit configured to store information received by the receivers 128a-128f, and a battery assembly configured to power the receivers 128a-128f and/or transmitters 172a-172b. The battery assembly may comprise a single battery, or may comprise an array of batteries arranged within the electronics bay 132 along the circumferential direction C. For example, the battery assembly may include eight batteries, though more or less than eight batteries is contemplated, depending on the particular electrical components contained in the electronics bay 132, as well as the particular arrangement of receivers 128 and transmitters 172. An operator at the surface 4 may be in communication with the electrical components of the acoustic logging tool thorough mud pulse telemetry, EM telemetry, and/or wire pipe systems as is known in the art.

Referring to FIGS. 2-7, the isolator section 108 includes at least one isolator cavity 150 configured to disrupt and/or deflect portions of the acoustic signals propagated through the isolator section 108 by the transmitter 172. In the depicted embodiment, the isolator section 108 has a plurality of cavities 150. Each cavity 150 extends from an outer surface 154 of the isolator section 108 into the isolator section 108 along the radial direction R. The structure of each cavity 150 will be described in further detail below. The isolator section 108 defines several cavities 150 spaced apart at varying distances along the axial direction A. As depicted, the isolator section 108 includes eleven isolator cavities 150, which will be referred to as first through eleventh cavities 150a-150k. However, it is contemplated that more or less cavities 150 are included. The isolator section 108 can also include at least one band 152 and at least one elastomeric compound that are disposed within a respective cavity 150. The band 152 can comprise a metallic material.

Figure 6:
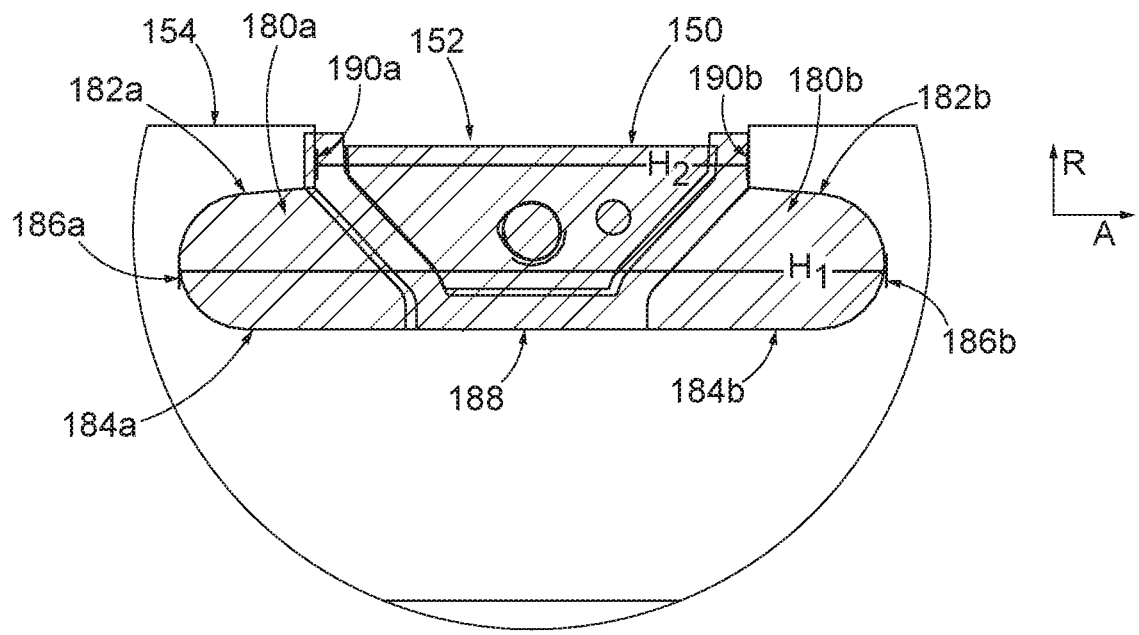
FIG. 6 is a partial side cross-sectional view of an isolator cavity of the acoustic logging tool shown in FIG. 2.
Figure 7:
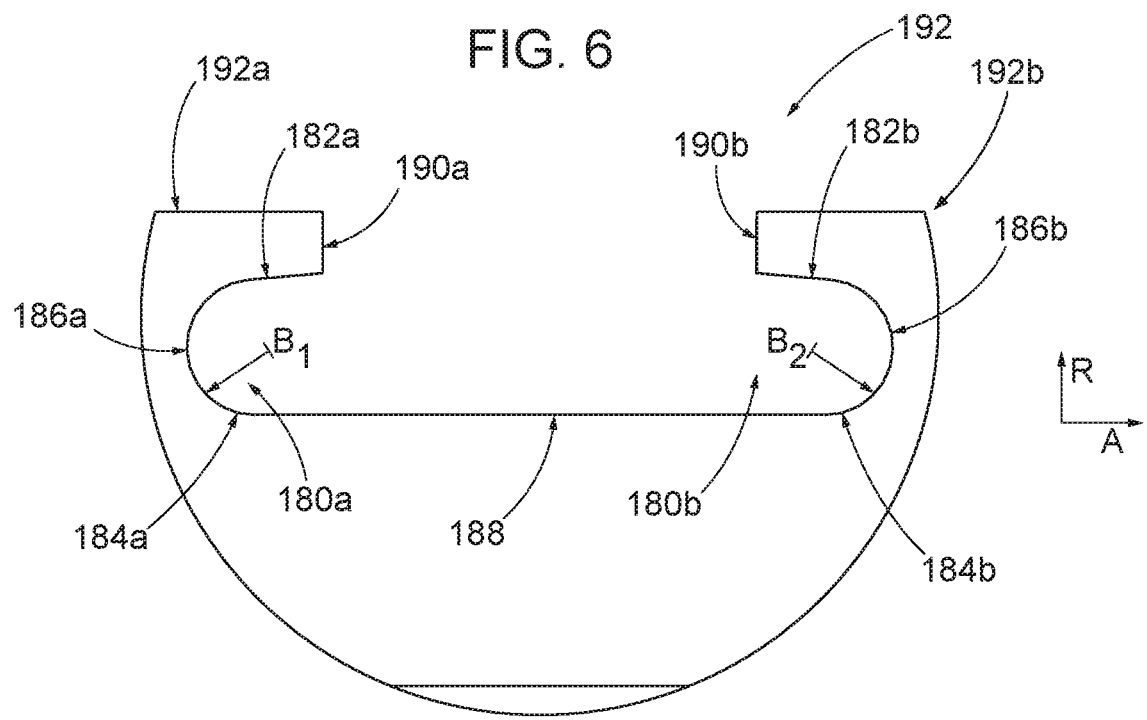
FIG. 7 is a partial side cross-sectional view of an isolator cavity of the acoustic logging tool shown in FIG. 2.

Continuing with FIGS. 6 and 7, an exemplary isolator cavity 150 extends around an entirety of the isolator section 108. Though only one isolator cavity 150 is described, the remaining depicted isolator cavities 150 are similar. The isolator cavity 150 includes a bottom surface 188, an upper recess 180a, and a lower recess 180b that is open to and faces the upper recess 180a. As shown in FIGS. 6 and 7, the isolator section 108 defines a first inward surface 184a, a first outward surface 182a spaced from the first inward surface 184a along the radial direction R, and a first curved wall 186a that extends from the first outward surface 182a to the first inward surface 184a. The first curved wall 186a may have a first radius of curvature $B_1$ that is between about 0.125 inches and about 1 inch. However, the radius of curvature $B_1$ can be contingent upon the overall diameter of the acoustic logging tool 100. Collectively, the first outward surface 182a, the first inward surface 184a, and the first curved wall 186a can define an upper recess 180a. Additionally, the first outward surface 182a, the first inward surface 184a, and the first curved wall 186a can each extend substantially around an entirety of the circumference of the isolator section 108. As a result, the upper recess 180a can extend around an entirety of the circumference of the isolator section 108.

Continuing with FIGS. 6 and 7, likewise, the isolator section 108 defines a second inward surface 184b, a second outward surface 182b spaced from the second inward surface 184b along the radial direction R, and a second curved wall 186b that extends from the second outward surface 182b to the second inward surface 184b. The second curved wall 186b may have a second radius of curvature $B_2$ that is between about 0.125 inches and about 1 inch. However, like the first radius of curvature $B_1$, the second radius of curvature $B_2$ can be contingent upon the overall size of the acoustic logging tool 100. The second radius of curvature $B_2$ can be the same as the first radius of curvature $B_1$. However, the first and second radii of curvature $B_1$ and $B_2$ can differ. Collectively, the second outward surface 182*b*, the second inward surface 184*b*, and the second curved wall 186*b* can define the lower recess 180*b*. Additionally, the second outward surface 182*b*, the second inward surface 184*b*, and the second curved wall 186*b* can each extend substantially around an entirety of the circumference of the isolator section 108. As a result, the lower recess 180*b* can extend around an entirety of the circumference of the isolator section 108. As can be seen in FIGS. 6 and 7, the bottom surface 188 extends from the first inward surface 184*a* to the second inward surface 184*b* along the axial direction A.

Furthermore, each isolator cavity 150 (and thus each recess) is generally perpendicularly with respect to the axial direction A and central axis 26 of the tool. Accordingly, isolator cavity 150 (and/or recess) is generally parallel to the other isolator cavities.

Continuing with FIGS. 6 and 7, the isolator section 108 defines sets of projection pairs 192 that together define the respective isolator cavities 150. The projection pairs 192 include a first projection 192*a* and a second projection 192*b*. The first projection 192*a* can define the first curved wall 186*a*, the first outward surface 182*a*, and a first lateral surface 190*a*. The second projection 192*b* can define the second curved wall 186*b*, the second outward surface 182*b*, and a second lateral surface 190*b*. The first and second lateral surfaces 190*a* and 190*b* can face each other to define a slot which the band 152 resides within.

The isolator cavity 150 includes multiple dimensions measured along the axial direction A. For example, the cavity 150 can define a first axial dimension Hi measured from the first curved wall 186*a* of the first projection 192*a* to the second curved wall 186*b* of the second projection 192*b* along the axial direction A, as well as a second axial dimension $H_2$ measured from the first lateral surface 190*a* of the first projection 192*a* to the second lateral surface 190*b* of the second projection 192*b* along the axial direction A. Due to the shape of the cavity 150, the first axial dimension $H_1$ is greater than the second axial dimension $H_2$. In this manner, the isolator section 108 defines the recesses as curved cutouts that extend around the entire circumference of the isolator section 108.

Referring back to FIGS. 2-4, the plurality of cavities 150*a*-150*k* are spaced apart from adjacent cavities 150 by a particular distance along the axial direction A. As depicted, the distance between adjacent cavities 150 varies, and generally decreases from cavity 150 to cavity 150 in the downhole direction D. Though only the distances between cavities 150*a*-*d* will be explicitly described, the general arrangement exemplified by cavities 150*a*-*d* can be representative of all of the cavities 150*a*-150*k*. As shown, the first cavity 150*a* is spaced from the second cavity 150*b* by a first distance $D_1$, the second cavity 150*b* is spaced from the third cavity 150*c* by a second distance $D_2$, and the third cavity 150$_c$ is spaced from the fourth cavity 150*d* by a third distance $D_3$. The first distance $D_1$ can be greater than the second and third distances $D_2$ and $D_3$, and the first and second distances $D_1$ and $D_2$ can be greater than the third distance $D_3$. However, in other embodiments, it is contemplated that the second and/or third distances $D_2$ and $D_3$ can be greater than the first distance $D_1$. Also, two or more of the distances $D_1$, $D_2$, and $D_3$ can be equal.

The acoustic logging tool 100 includes one or more bores that extend through its component bodies. The bores, for example, 204, 208, are formed to house wires and other components of the acoustic logging tool 100. The bores are also formed to be open through the various weldments that mount the tool sections together. For example, the acoustic logging tool 100 can define a feedthrough bore that extends from the receiver section 102, through the isolator section 108, and to the transmitter section 104 along the axial direction A. In accordance with the illustrated embodiment, the feedthrough bore can be comprised of a first feedthrough bore (not numbered) defined by the receiver section 102, a second feedthrough bore 208 defined by the isolator section 108, and a third feedthrough bore 204 defined by the transmitter section 104. The first feedthrough bore, second feedthrough bore 208, and third feedthrough bore 204 are each aligned along the axial direction A and but are offset with respect to the central bore 115 through which drilling mud flows.

The bores of the acoustic logging tool 100 may also include receiver bores. The receiver bores (not shown) extend from the receiver section 102, through the isolator section 108, and to the transmitter section 104 along the axial direction A. The receiver bores may include a first receiver bore defined by the receiver section 102 and a second receiver bore defined by the isolator section 108, where the first and second receiver bores are aligned along the axial direction A.

Additionally, the bores of the acoustic logging tool 100 may include transmitter bores (not shown) that extend from the transmitter section 104, through the isolator section 108, and to the receiver section 102 along the axial direction A. The transmitter bores can be comprised of a first transmitter bore defined by the isolator section 108 and a second transmitter bore defined by the transmitter section 104, where the first and second transmitter bores are aligned along the axial direction A.

The feedthrough bores, receiver bores, and transmitter bores may be spaced apart with respect to the central bore 115 along a radial direction R that is perpendicular to the axial direction A. The feedthrough bore, the receiver bores, and the transmitter bores may be spaced apart with respect to each other along the circumferential direction C, i.e., disposed around the central axis 26.

The feedthrough, receiver, and transmitter bores may be configured to contain various components of the acoustic logging tool 100, such as wires that extend between various features of the acoustic logging tool 100. The bore may be configured as hydraulic passages.

Figure 5:
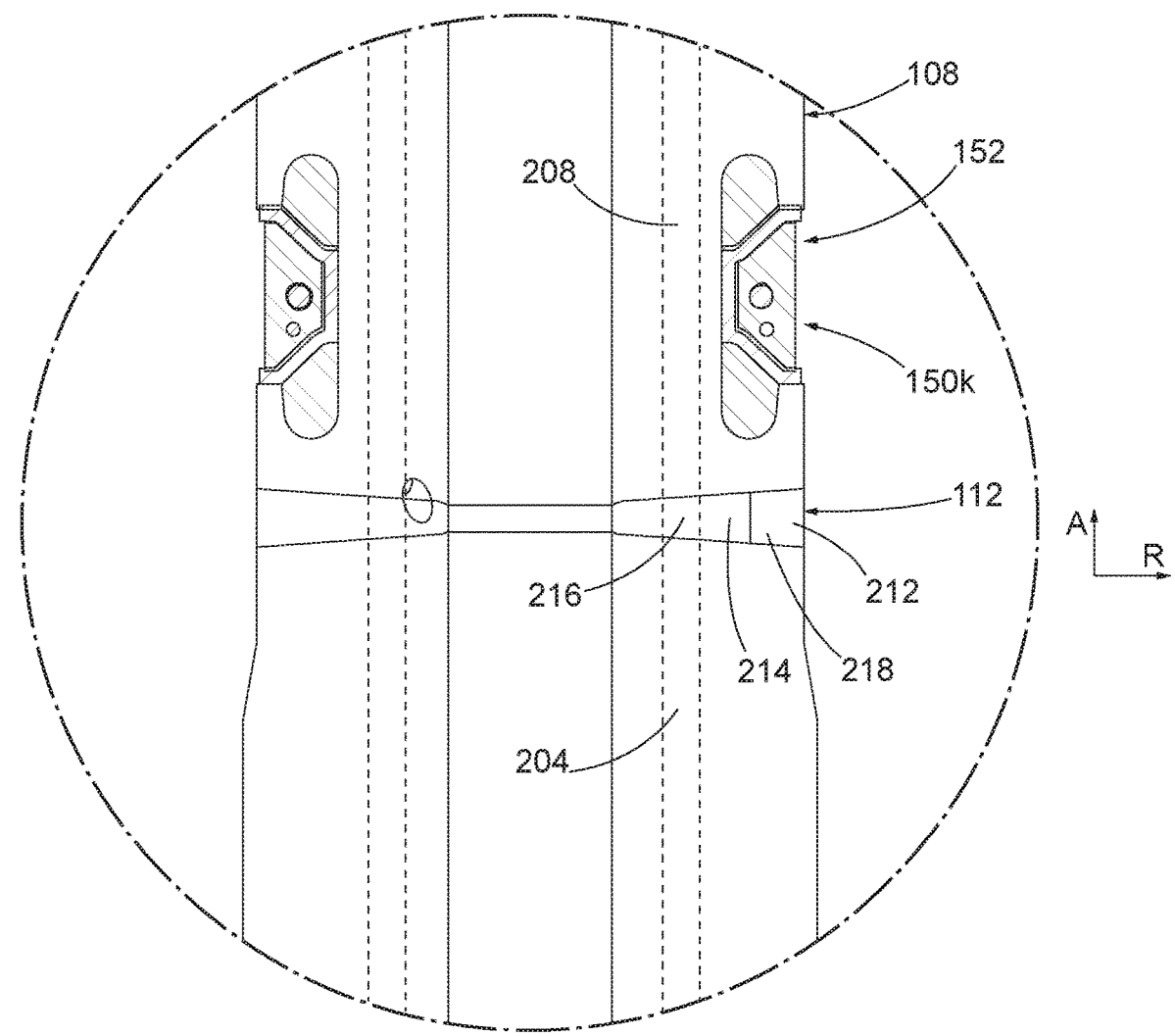
FIG. 5 is a detailed cross-sectional view of the encircled region of the acoustic logging tool shown in FIG. 4.

Referring to FIGS. 4 and 5, a lower weldment 112 mounts the transmitter section 104 to the isolator section 108. The lower weldment 112 defines a slot 212 machined into the lower weldment 112 that extends inwardly from an outer surface of the lower weldment 112 along the radial direction R. The slot 212 is configured to be open to first and second bores 204 and 208. The slot 212 can include a slot cover 214 disposed within the slot 212, such that the slot cover 214 and the lower weldment 112 collectively define a slot bore 216 that is aligned with the first bore (not shown) and the second bore 208 along the axial direction A. The lower weldment 112 can also include a sealing weld 218 that secures the slot cover 214 within the slot, such that the slot cover 214 is positioned between the sealing weld 218 and the slot bore 216 along the radial direction R. Though one slot is described as extending through the lower weldment 112, the lower weldment 112 can define multiples slots as desired.

The upper weldment 110 is formed between the isolator section 108 and the receiver section 102. The upper weldment 110 is similar in construction to the lower weldment 112 shown in FIG. 5. For instance, the upper weldment 110 includes a slot that is open to bores, a slot cover in the lower slot and a lower sealing weld that secures the lower slot cover within the lower slot. Though an upper and lower weldment 110 and 112 are specifically described, it is contemplated that the acoustic logging tool 100 can include more or less weldments. The upper and lower weldments attach multiple sections of the acoustic logging tool 100 together while allowing open communication for bores to route wires as needed.

In operation, after the acoustic logging tool 100 is lowered downhole into a well, the transmitters 172*a*-172*b* emits acoustic waves into the earthen formation 3 surrounding the drill string 6. These acoustic waves pass through the earthen formation 3, and at least a portion of the acoustic waves are received by the receivers 128*a*-128*f*. However, a portion of the acoustic waves tend to propagate through the isolator section 108 and toward the receiver section 102. The cavities 150*a*-150*k* defined by the isolator section 108, as well as the bands 152 that may be disposed within the cavities 150*a*-150*k*, help in disrupting, attenuating, and/or dispersing the acoustic waves propagating along the isolator section 108. In practice, the isolator section 108, via the isolator cavities 150, greatly minimizes the tool mode of the acoustic wave, which, in turn, reduces the signal noise received by the receivers 128*a*-128*f*, thereby improving the signal detection capability and processing of the waveform data from the receivers 128*a*-128*f*. The isolating qualities of the isolator section 108 can be attributed to the optimized geometry of the cavities 150*a*-150*k* described above, such as the curved walls 186*a*-186*b*, how they extend around the entire circumference, and the variable spacing of the cavities 150*a*-150*k* along the axial direction A. Also, by varying the spacing of the cavities 150*a*-150*k*, as well as by varying the geometry of the cavities 150*a*-150*k* and the number of cavities 150, the acoustic logging tool 100 can be designed to attenuate specific frequency ranges.

As discussed above, the acoustic logging tool is optimized to minimize the tool mode. "Tool mode" is a term of art that encompasses more than just the direct transmitter/receiver coupling, but also includes drilling related noise, mud flow related noise, as well as the noise contribution of surface waves along the tool body. The isolator section is configured to help manage all of these noise contributions. Furthermore, the design of the transmitters and receivers has elements, such as the structure of the seats in which they are positioned, that can help minimize direct coupling effects of the noise.

It will be appreciated by those skilled in the art that various modifications and alterations of the present disclosure can be made without departing from the broad scope of the appended claims. Some of these have been discussed above and others will be apparent to those skilled in the art. The scope of the present disclosure is limited only by the claims.

What is claimed:

1. An acoustic logging tool for determining a characteristic of an earthen formation during a drilling operation, the acoustic logging tool comprising:
    a transmitter section that includes a transmitter that is configured to emit an acoustic signal;
    an isolator section mounted to the transmitter section, the isolator section defining an inward surface, an outward surface spaced from the inward surface, and a curved wall that extends from the inward surface to the outward surface, such that the inward surface, the outward surface, and the curved wall at least partially define a recess, the recess continuously extending around an entirety of a circumference of the isolator section, wherein each recess is configured to interrupt at least a portion of the acoustic signal that travels through the isolator section; and
    a receiver section mounted to the isolator section opposite to the transmitter section, the receiver section including a receiver that is configured to receive at least a portion of the acoustic signal.

2. The acoustic logging tool of claim 1, wherein the outward surface and the curved wall extend around the entirety of the isolator section.

3. The acoustic logging tool of claim 1, wherein the isolator section is elongate along an axial direction and the outward surface is spaced from the inward surface along a radial direction that is perpendicular to the axial direction.

4. The acoustic logging tool of claim 3, wherein the isolator section has a body and a projection that extends outwardly from the body in the radial direction, wherein the projection defines the curved wall and the outward surface.

5. The acoustic logging tool of claim 1, wherein the isolator section includes a band and at least one elastomeric compound located at least partially in the recess.

6. The acoustic logging tool of claim 1, wherein the recess is an upper recess and the isolator section defines a lower recess that faces the upper recess, wherein the lower and upper recesses define an isolator cavity.

7. The acoustic logging tool of claim 6, wherein the isolator section includes a set of isolator cavities that are spaced apart with respect to each other along an axial direction, wherein adjacent isolator cavities are spaced apart a distance that varies among the set of isolator cavities.

8. The acoustic logging tool of claim 1, wherein the curved wall has a radius of curvature of between about 0.125 inches and about 1 inch.

9. The acoustic logging tool of claim 1, wherein the transmitter is a monopole transmitter or a dipole transmitter.

10. The acoustic logging tool of claim 1, wherein the transmitter is a plurality of transmitters.

11. The acoustic logging tool of claim 1, wherein the receiver is a monopole transducer.

12. The acoustic logging tool of claim 1, wherein the receiver is a plurality of receivers.

13. The acoustic logging tool of claim 12, wherein the plurality of receivers is between six receivers and twenty-four receivers.

14. The acoustic logging tool of claim 1, wherein the transmitter section and the isolator section are mounted to each other by a lower weldment, and the receiver section and the isolator section are mounted to each other by an upper weldment.

15. The acoustic logging tool of claim 14, wherein the receiver section defines a first bore, the isolator section defines a second bore that is aligned with the first bore, and the receiver section defines a third bore that is aligned with the second bore, wherein the first bore, the second bore and the third bores each contain at least one wire.

16. The acoustic logging tool of claim 15, wherein the upper weldment comprises:
    an upper slot that is open to the first and second bores;
    an upper slot cover in the upper slot; and
    an upper sealing weld that secures the upper slot cover within the upper slot.

17. The acoustic logging tool of claim 15, wherein the lower weldment comprises:
   a lower slot that is open to the second and third bores;
   a lower slot cover in the lower slot; and
   a lower sealing weld that secures the lower slot cover within the lower slot.

18. The acoustic logging tool of claim 17, wherein the isolator section defines an inward surface, an outward surface spaced from the inward surface in a radial direction that is perpendicular to an axial direction, and a curved wall that extends from the inward surface to the outward surface, wherein the inward surface, the outward surface, and the curved wall at least partially define the first cavity.

19. An acoustic logging tool for determining a characteristic of an earthen formation during a drilling operation, the acoustic logging tool comprising:
   a transmitter section that houses a transmitter configured to emit an acoustic signal;
   an isolator section mounted to the transmitter section, the isolator section being elongate along an axial direction and having a first cavity, a second cavity spaced from the first cavity a first distance along the axial direction, and a third cavity spaced from the second cavity a second distance along the axial direction, the second distance being different than the first distance, and each cavity continuously extending around an entirety of a circumference of the isolator section, wherein each cavity is configured to interrupt at least a portion of the acoustic signal that travels through the isolator section; and
   an upper receiver section mounted to the isolator section opposite to the transmitter section along the axial direction, the upper receiver section including a receiver that is configured to receive at least a portion of the acoustic signal.

20. The acoustic logging tool of claim 19, wherein the isolator section defines a fourth cavity spaced from the third cavity a third distance in the axial direction, wherein the third distance is different than one of the first distance and the second distance.

21. The acoustic logging tool of claim 19, wherein the third distance is different than both the first distance and the second distance.

22. The acoustic logging tool of claim 19, wherein the second distance is less than the first distance.

23. The acoustic logging tool of claim 19, wherein the second distance is greater than the first distance.

24. The acoustic logging tool of claim 19, wherein the isolator section defines an inward surface, an outward surface spaced from the inward surface in a radial direction that is perpendicular to the axial direction, and a curved wall that extends from the inward surface to the outward surface, wherein the inward surface, the outward surface, and the curved wall at least partially define the first cavity.

25. The acoustic logging tool of claim 19, wherein the curved wall has a radius of curvature of between about 0.125 inches and about 1 inch.

26. The acoustic logging tool of claim 19, wherein the transmitter section and the isolator section are mounted to each other by a lower weldment, and the receiver section and the isolator section are mounted to each other by an upper weldment.

27. The acoustic logging tool of claim 26, wherein the receiver section defines a first bore, the isolator section defines a second bore that is aligned with the first bore, and the lower receiver section defines a third bore that is aligned with the second bore, wherein the first bore, the second bore and the third bores each contain at least one wire.

28. The acoustic logging tool of claim 26, wherein the upper weldment comprises:
   an upper slot that is open to the first and second bores;
   an upper slot cover in the upper slot; and
   an upper sealing weld that secures the upper slot cover within the upper slot.

29. The acoustic logging tool of claim 28, wherein the lower weldment comprises:
   a lower slot that is open to the second and third bores;
   a lower slot cover in the lower slot; and
   a lower sealing weld that secures the lower slot cover within the lower slot.

30. The acoustic logging tool of claim 29, wherein the isolator section defines an inward surface, an outward surface spaced from the inward surface in a radial direction that is perpendicular to the axial direction, and a curved wall that extends from the inward surface to the outward surface, wherein the inward surface, the outward surface, and the curved wall at least partially define the first cavity.

* * * * *